US006504736B1

(12) United States Patent
Ono

(10) Patent No.: US 6,504,736 B1
(45) Date of Patent: Jan. 7, 2003

(54) CURRENT-VOLTAGE CONVERTER

(75) Inventor: Akihiko Ono, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/078,442

(22) Filed: Feb. 21, 2002

(30) Foreign Application Priority Data

Jul. 26, 2001 (JP) ....................................... 2001-225605

(51) Int. Cl.[7] ............................ H02M 7/00; G05F 3/08; G05F 3/20

(52) U.S. Cl. .......................... 363/73; 323/315; 323/316

(58) Field of Search ............................ 363/73; 323/316, 323/314, 315

(56) References Cited

U.S. PATENT DOCUMENTS 4,967,140 A * 10/1990 Groeneveld et al. ........ 323/315
5,113,129 A * 5/1992 Hughes ...................... 323/316
5,920,184 A * 7/1999 Kadanka ..................... 323/314
5,973,936 A * 10/1999 Lenz et al. ................. 323/285
6,356,065 B1 * 3/2002 Miyazaki .................... 323/313

* cited by examiner

*Primary Examiner*—Bao Q. Vu
(74) *Attorney, Agent, or Firm*—Staas & Halsey LLP

(57) ABSTRACT

There is intended to provide a current-voltage converter capable of surely outputting a voltage output signal regardless of current intensity when converting a current input signal with wide current range into a voltage output signal. In case a current value of a current input signal Iin is small, small current regions of diodes D101 and D102 are used and current values of first bias currents IB1 and IB2 are set small. Thereby, the small current regions can be used as a region to deal with a large change rate of voltage against current and there can be obtained an effective voltage change even for a micro current. In case a current value of the current input signal Iin is large, current values of bias currents IB1 and IB2 at a constant current circuit 13 increase to a second bias current to obtain a characteristic such that conversion voltage VM and reference voltage VP are compressed against the current input signal Iin. To obtain the compression characteristics, there is made used of a characteristic of the diodes D101 and D102 such that their terminal-to-terminal voltage against current increases monotonously forming a convex shape. Thereby, output voltage can keep compressed differential voltage in a wide current range. Accordingly, a differential amplifier circuit AMP101 does not need to change its dynamic range.

18 Claims, 12 Drawing Sheets

CURRENT - VOLTAGE CONVERTER DIRECTED TO FIRST EMBODIMENT

CURRENT - VOLTAGE CONVERTER DIRECTED TO FIRST EMBODIMENT

CURRENT - VOLTAGE CONVERTER DIRECTED TO SECOND EMBODIMENT

SPECIFIC EXAMPLE OF SECOND EMBODIMENT

OPERATIONAL WAVEFORMS DIRECTED TO FIRST AND SECOND EMBODIMENT

CURRENT - VOLTAGE CONVERTER DIRECTED TO THIRD EMBODIMENT

SPECIFIC EXAMPLE OF THIRD EMBODIMENT

OPERATIONAL WAVEFORMS DIRECTED TO THIRD EMBODIMENT

CURRENT - VOLTAGE CONVERTER DIRECTED TO FOURTH EMBODIMENT

OPERATIONAL WAVEFORMS DIRECTED TO FOURTH EMBODIMENT

SPECIFIC EXAMPLE OF RESET SIGNAL GENERATING CIRCUIT

OPERATIONAL WAVEFORM DIRECTED TO SPECIFIC EXAMPLE OF RESET SIGNAL GENERATING CIRCUIT

SPECIFIC EXAMPLE OF BOTTOM HOLDING CIRCUIT

CURRENT - VOLTAGE CONVERTER DIRECTED TO FIRST RELATED ART

CURRENT - VOLTAGE CONVERTER DIRECTED TO SECOND RELATED ART

CURRENT-VOLTAGE CONVERTER

BACKGROUND OF THE INVENTION

1. Field of the Invention

The present invention relates to a current-voltage converter that converts presence/absence of an input signal into a voltage signal when current wide in amplitude range is inputted. More particularly, it relates to a current-voltage converter used for the case after an optical input signal detected by an optical detective element in the course optical communications or the like is converted into a current input signal.

2. Description of Related Art

Recent years, infrared data communication (IrDA communication) function for connecting communication terminals with infrared rays has been applied to mobile terminals, personal computers, cellular phones, and the like. Furthermore, optical fiber communication networks have been well established as communication infrastructure. In such a communication system, an optical signal of infrared ray or the like is used as a digital signal. More specifically, an optical signal is converted into a current signal and the converted current signal is further converted into a voltage signal, thereby making it possible to detect presence/absence of the optical signal.

FIG. 13 shows a current-voltage converter 100 as a first related art. A pair of constant current source transistors M101, and M102 connect emitter terminals of transistors Q101 and Q102 and ground voltage GND. Base terminals of the transistor Q101, and Q102 connect to bias voltage source VBIAS. Diodes D101 and D102 connect collector terminals of the transistors Q101 and Q102 and power source voltage VCC. A photo diode PD for detecting an optical input signal connects to a connection point of the emitter terminal of the transistor Q101 and the constant current source transistor M101. Further on, connection points VM and VP connect the transistor Q101 and the diode D101, the transistor Q102 and the diode D102, respectively. These connection points VM and VP connect to a pair of differential input terminals of a differential amplifier circuit AMP101 to constitute a conversion voltage terminal VM and a reference voltage terminal VP for the current-voltage converter 100.

An optical input signal is detected by the photo diode PD, i.e., inputted as a current input signal Iin, and then, converted into a voltage value, and finally outputted to a next stage such as the differential amplifier circuit AMP101. It should be noted that the input terminal of the current-voltage converter 100 herein is shown as a single input. That is, as a circuit structure to conduct current-voltage conversion of an input signal Iin, the current-voltage converter 100 is provided with the diode D101, the transistor Q101, and the constant current source transistor M101. A similar circuit structure consisting of the diode D102, the transistor Q102, and the constant current source transistor M102 is also incorporated therein so as to determine an operational point of the current-voltage converter 100. Thereby, it is structured such that differential voltage between reference voltage VP corresponding to output voltage to be outputted to the reference voltage terminal VP and conversion voltage VM to be outputted to conversion voltage terminal VM is outputted as output voltage. Furthermore, as to the complimentary circuit, the connection point for the emitter terminal of the transistor Q102 and the constant current source transistor M102 can connect to a load such as a capacitance element. More specifically, the capacitance element is structured as a dummy terminal for making input loads of differential inputs same and corresponds to a the photo diode PD. Furthermore, a pair of current input signals complementary to each other can be inputted to obtain differential current signals.

Current converted into a current input signal Iin by the photo diode PD joins to a bias current IB1 flowing from the constant current source transistor M101 and flows to the diode D101 through the transistor Q101. An anode terminal of the diode D101 connects to the power source voltage terminal VCC. Therefore, forward voltage of the diode D101 having dropped is outputted to the conversion voltage terminal VM. The forward voltage of the diode D101 generates when the converted current flows there. On the other hand, a bias current IB2 flows coming from the constant current source transistor M102 flows into the diode D102 and dropping voltage equivalent to the forward voltage of the diode D102 obtained when the bias current IB2 from the power source voltage VCC flows thereto. Accordingly, the differential amplifier circuit AMP101 detects two inputs as differential voltage, namely, (1) the reference voltage VP outputted from the reference voltage terminal VP, and (2) the conversion voltage VM outputted from the conversion voltage terminal VM equivalent to voltage having dropped by the forward voltage which generates when a current input signal Iin flows to the diode D101 in comparison with the reference voltage VP.

In the current-voltage converter 100, the diode D101 converts a current input signal Iin into a form of logarithmic compression. Therefore, the conversion voltage VM for the conversion voltage terminal VM operates with an amplitude approximate to an operational point of about 0.7 V corresponding to forward voltage which makes diode conductive.

In general, a group of the diode D101, the transistor Q101, and the constant current source transistor M101, and a corresponding group of the diode D102, the transistor Q102, and the constant current source transistor M102 are structured with identical circuit elements, respectively. Theirs respective bias currents IB1 and IB2 are identical to each other.

FIG. 14 shows a current-voltage converter 200 as a second related art. In addition to the component elements of the current-voltage converter 100, the current-voltage converter 200 has a structure such that resistance elements R101 and R102 are connected in parallel to diodes D101 and D102 connected between collector terminals of transistors Q101 and Q102, and power source voltage VCC. Other than the above-mentioned partial structure, an essential circuit structure of the current-voltage converter 200 is similar to that of the current-voltage converter 100. Accordingly, in the second related art, same numerals are assigned to composing elements identical to the first related art and description of them will be omitted.

In the current-voltage converter 200, bias currents IB1 and IB2 flow to loads R101-D101 and R102-D102, respectively, wherein the resistance elements R101, R102 and the diodes D101, D102 are connected in parallel to one another. Accordingly, as to the load to which a current input signal Iin flows, current IB1+Iin mainly flows in the resistance element R1 until terminal-to-terminal voltage drop of a load reaches of about 0.7 V, forward voltage which makes the diode D101 conductive. A characteristic of conversion voltage outputted from a conversion voltage terminal VM varies in proportion to a current input signal Iin. After the current increases and the terminal-to-terminal voltage drop of a load reaches of about 0.7 V, the forward voltage of the diode D101, the current mainly flows in the diode D101 and the characteristic of the conversion voltage outputted from the conversion voltage terminal VM shifts to a characteristic of logarithmic compression against the current input signal Iin.

In general, a group of the diode D101, the transistor Q101, and the constant current source transistor M101, and a corresponding group of the diode D102, the transistor Q102, and the constant current source transistor M102 are structured with identical circuit elements, respectively. Theirs respective bias currents IB1 and IB2 are identical to each other. Further on, theirs respective resistance elements are also identical to each other.

However, in optical communications such as IrDA communication including infrared regions, an optical input signal dealt in the communications is a burst signal consisting of continuous pulse rows, in general. That is, a burst signal is a signal which is changeable in its pulse widths and duty ratio of pulses. Furthermore, intensity of light to be transmitted changes significantly depending on transmission distance or transmission environment of optical input signal. Accordingly, there has been a difficulty such that a current-voltage converter can hardly secure stable outputs of output voltage when converting current input signals into output voltage signals wherein optical input signals diverse in optical intensity are converted into current input signals.

Details will be described hereinafter. In the first related art, logarithmic compression processing is applied to whole input current range of current input signals, thereby to obtain output voltage.

Therefore, due to long distance between light source and a current-voltage converter, weakness of light intensity of light source, bad conditions for light propagation, or the like, there may be case such that micro current as a current input signal Iin is inputted and added to a bias current IB1 in the current-voltage converter 100. In such a case, voltage amplitude of converted output voltage results in a micro signal, whereby there arise problems such that noises are caused and normal output voltage signals are hard to be detected.

Furthermore, it is conceivable to lower bias current so as to detect output voltage signals accurately even when micro current is inputted. In such a case, a voltage value of an output voltage signal to which logarithmic compression is applied can be detected because a current input signal Iin to be added to a bias current IB1 can be made relatively larger. However, in such situation, a bias current IB1 is small compared with the current input signal Iin. Accordingly, bias state with respect to the diode D101, the transistor Q101, the constant current transistor M101 and the like in the current-voltage converter 100 changes significantly every switching of current input signal Iin. As a result, the current-voltage converter 100 cannot secure high-speed response capability. Further on, with respect to a current input signal Iin and conversion voltage VM for the conversion voltage terminal VM, waveform of a signal when being turned is likely to be deformed, and that of a signal when being terminated is likely to have tale phenomenon. As a result, response capability against state change deteriorates, which causes a problem such that response capability cannot keep up with high-speed frequency operation.

In the second related art, until terminal-to-terminal voltage of the resistance element R101 reaches forward voltage of the diode D101 (of about 0.7 V), sum current of a bias current IB1 and a current input signal Iin mainly flows in the resistance element R101. At this condition, a characteristic of conversion voltage of the conversion voltage terminal VM varies in proportion to a current input signal Iin. After the terminal-to-terminal voltage has reached the forward voltage of the diode D101 (of about 0.7 V), the sum current mainly flows in the diode D101 and the characteristic of the conversion voltage shifts to a characteristic of logarithmic compression. If bias currents IB1 and IB2 are set higher in this situation, the diode D101 shifts to a clamp state even if it is against a micro current input signal Iin. In the process of current-voltage conversion, voltage amplitude of an output voltage is converted into a very small signal through logarithmic compression processing. As a result, it becomes difficult to detect output voltage signals due to noises and the like. Therefore, to overcome the above problem, the bias currents IB1, IB2 can be set low. That is, with low bias current, a linear current-voltage conversion characteristic can be obtained for a micro current input signal Iin. However, with such current setting, it is not feasible to lower the differential voltage between the reference voltage terminal VP and the conversion voltage terminal VM to the forward voltage of the diode D101 (of about 0.7 V) when a large current input signal is inputted. Therefore, there arises a problem such that the input stage circuit structure of a next stage such as the differential amplifier circuit AMP101 is restricted.

SUMMARY OF THE INVENTION

The present invention is intended to solve the foregoing prior art deficiency. Its prime object is to provide a current-voltage converter capable of surely outputting an accurate voltage output signal regardless of current intensity when converting a current input signal with wide current range into a voltage output signal.

In order to achieve the above objective, a current-voltage converter that converts input current into output voltage that corresponds to differential voltage between conversion voltage outputted in response to input current and reference voltage, based on one aspect of this invention, comprises: a first current-voltage converting section that outputs the reference voltage derived from reference current; and a second current-voltage converting section that has a current-voltage conversion characteristic same as the first current-voltage converting section and outputs the conversion voltage in response to the input current, wherein both the current-voltage conversion characteristic of the first current-voltage converting section and that of the second current-voltage converting section are changed to compress conversion rate of the output voltage against the input current in case the input current is same as or higher than a predetermined current value.

In the current-voltage converter according to the one aspect of the present invention, the first current-voltage converting section and the second current-voltage converting section with the same current-voltage conversion characteristics output reference voltage and conversion voltage, respectively. In case input current is same as or higher than a predetermined current value, both the current-voltage conversion characteristic of the first current-voltage converting section and that of the second current-voltage converting section are changed to compress conversion rate of the output voltage against the input current and output the output voltage that corresponds to the differential voltage of the conversion voltage against the reference voltage.

Thereby, a current-voltage conversion characteristic appropriate for degree of input current can be set and optimal output voltage against wide input current range can be obtained. In case micro current is inputted as input current, change rate of current-voltage conversion characteristic is made large thereby making it possible to accurately detect input current without being influenced by noises therearound. Furthermore, conversion rate of the current-voltage conversion characteristic is made larger against input current same as or smaller than the predetermined current value where as it is made smaller against input current same as or larger than the predetermined current value. Thereby, output voltage range can be compressed to be narrow against wide input current region and an output voltage range suitable to a circuit structure of next stage can be set.

The above and further objects and novel features of the invention will more fully appear from following detailed description when the same is read in connection with the accompanying drawings. It is to be expressly understood, however, that the drawings are purpose of illustration only and not intended as a definition of the limits of the invention.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings.

DETAILED DESCRIPTION OF THE PREFERRED EMBODIMENTS

Preferred embodiments of the current-voltage converter embodied in first through fourth embodiments will be explained in detail with reference to FIG. 1 through FIG. 12.

Figure 1:
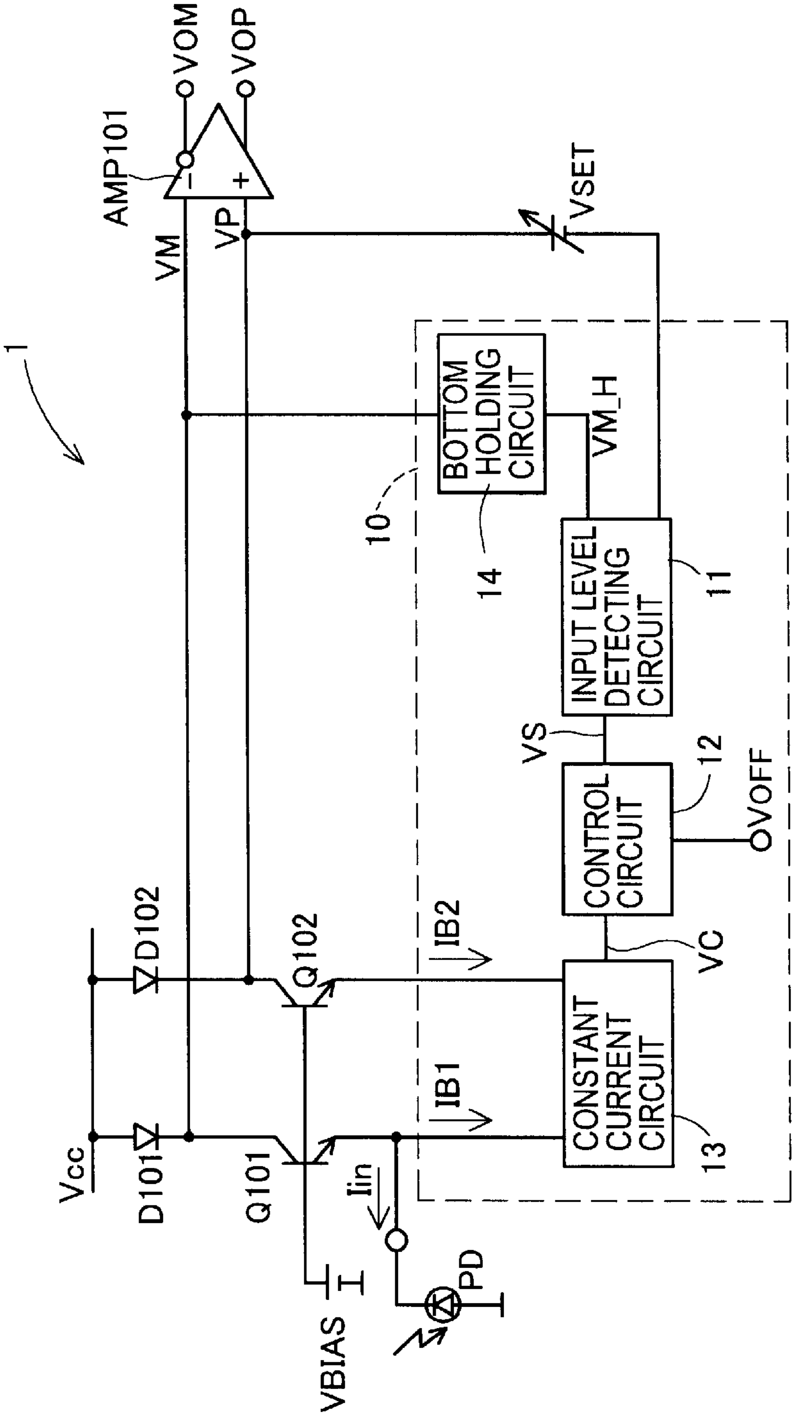
FIG. 1 is a circuit block diagram showing a current-voltage converter directed to a first embodiment.

A current-voltage converter 1 directed to a first embodiment shown FIG. 1 includes a bias current control section 10, in addition to the component elements of the current-voltage converter 100 directed to the first related art. Accordingly, in the first embodiment, same numerals are assigned to component elements identical to the first related art and description of them will be omitted. In the bias current control section 10, a conversion voltage terminal VM connects to a bottom holding circuit 14, and a reference voltage terminal VP connects to high-voltage-side terminal of an offset voltage source VSET. An output terminal VM_H coming from the bottom holding circuit 14 and a low-voltage-side terminal of the offset voltage source VSET connect to an input level detecting circuit 11. A reset signal VOFF is inputted to a reset terminal VOFF of a control circuit 12, and an output terminal VC is connected to a constant current circuit 13. Output terminals of the constant current circuit 13 are connected to emitter terminals of transistors Q101 and Q102.

In the current-voltage converter 1 directed to the first embodiment, at initial state, first bias currents, namely, bias currents IB1 and IB2 (IB1=IB2) flow from power source voltage VCC to their respective output terminals of the constant current circuit 13 through transistors Q101 and Q102, and diodes D101 and D102, respectively. The diode D101 and D102 correspond to a first current-voltage converting section and a second current-voltage converting section, respectively. Accordingly, with a state such that light signal is not detected so no current input signal exists, voltage drop occurs when the first bias currents flow to the diodes D101 and D102. Further on, due to a forward voltage characteristic of the diodes D101 and D102, pluralities of reference voltage; VP same in voltage value are outputted to a conversion voltage terminal VM and a reference voltage terminal VP.

Detecting an optical signal, a photo diode PD helps to add a current input signal Iin to the bias current IB1 which is the first bias current. Thereby, the forward voltage generates at the diode D101 in response to current quantity of the current input signal Iin added. Since forward voltage of the diode D102 does not vary, a differential voltage of voltage drop with respect to the diodes D101 and D102 is obtained as output voltage.

When the current input signal Iin is small, current uses a region which is small in terms of current and voltage characteristics of the diodes D101 and D102. Therefore, it is preferable that current values of the first bias current IB1 and IB2 are set small. Since change rate of the diode characteristic under this situation does not come to small in response to change rate of small current. Therefore, even though change rate of current is significantly small, effective change rate of voltage develops to terminal-to-terminal voltage of the diodes D101 and D102. Thereby, a differential amplifier circuit AMP101 can detect differential voltage caused by voltage drop of the conversion voltage terminal VM against the reference voltage terminal VP. It should be noted that detectable differential voltage is small compared with an offset voltage source VSET at the bias current control section 10. Accordingly, an input level detecting circuit 11 does not output a detecting signal VS for switching bias currents IB1 and IB2.

The larger a current input signal Iin is, the larger forward voltage of the diode D101 is. Thereby, a voltage value at the conversion voltage terminal VM drops and an output voltage corresponding to the differential voltage between the conversion voltage terminal VM and the reference voltage terminal VP becomes larger. When the differential voltage exceeds the voltage value of the offset voltage source VSET in the bias current control section 10, the input level detecting circuit 11 detects that the output voltage reaches a predetermined voltage value. An detecting signal VS outputted from the output terminal VS is inversed to high level, whereby the control circuit 12 is set and the control signal VC in high level is outputted from the control terminal VC. Detecting the control signal VC, the constant current circuit 13 makes the bias current IB1 and IB2 increase to the second bias current from the first bias current. The bias currents IB1 and IB2 flow to the diodes D101 and D102 through the transistors Q101 and Q102, respectively. It should be noted that with respect to the diodes D101 and D102, characteristic of their terminal-to-terminal voltage against conducting current has a convex-shaped-monotone-increasing characteristic, whereby a current value of the bias currents IB1 and IB2 flowing in the diodes D101 and D102, respectively, increase to the second bias current from the first bias current. Therefore, output voltage corresponding to differential voltage of the conversion voltage output VM to be outputted to the conversion voltage terminal VM and the reference voltage output VP to be outputted to the reference voltage terminal VP has a characteristic of being more compressed against a current input signal Iin. At this point, the reference voltage output VP outputted to the reference voltage terminal VP corresponds to a reference voltage VP at an operational point that a current/voltage characteristic of the diodes is more compressed. Therefore, differential voltage of the reference voltage output VP and conversion voltage compressed in accordance with a current input signal Iin flowing in the diode D101 is outputted to the differential amplifier circuit AMP101. The current/voltage characteristic of the diodes is compressed more than a forward voltage characteristic obtained with the first bias current by making the bias current value increase to the second bias current. Therefore, even if a current value of a current input signal Iin varies significantly, output voltage maintains compressed differential voltage. Accordingly, it is not at all necessary to change input dynamic range of the differential amplifier circuit AMP101 significantly, similar to a case of current input signal Iin with small current range.

Figure 2:
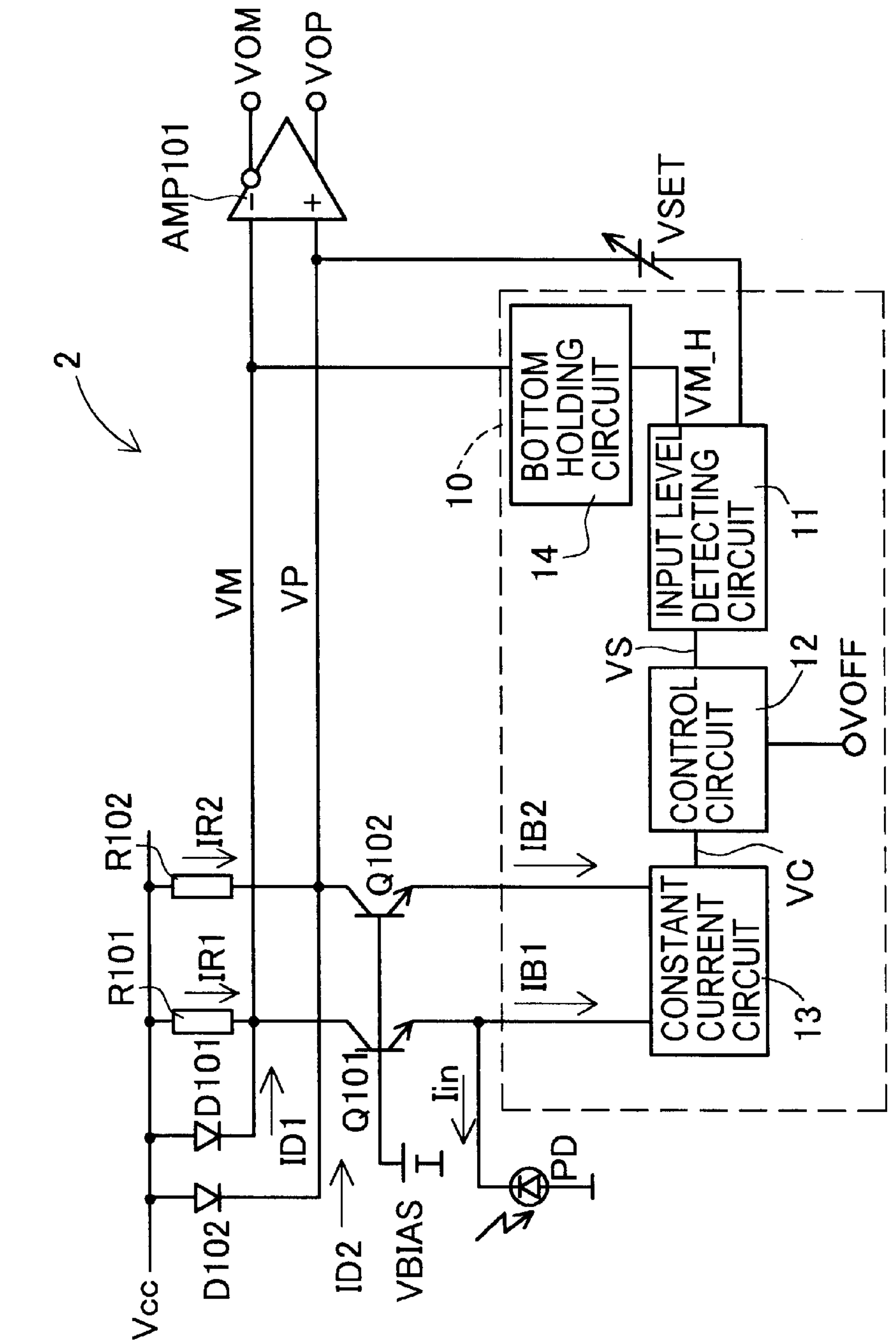
FIG. 2 is a circuit block diagram showing a current-voltage converter directed to a second embodiment.

A current-voltage converter 2 directed to a second embodiment shown FIG. 2 is structured such that resistance elements R101 and R102 are connected in parallel with the diodes D101 and D102 corresponding to the first current-voltage converting section and the second current-voltage converting section, respectively, for the current-voltage converter 1 directed to the first embodiment. In the second embodiment, same numerals are assigned to component elements identical to the second related art and the first embodiment, and description of them will be omitted.

In the current-voltage converter 2 directed to the second embodiment, at initial state, first bias currents, namely, bias currents IB1 and IB2 (IB1=IB2) flow from power source voltage VCC to their respective output terminals of the constant current circuit 13 through diodes D101 and D102, and resistance elements R101 and R102 connected in parallel one another via transistors Q101 and Q102. Under such condition, the first bias current is set small so that the bias currents IB1 and IB2 should not flow in the diodes D101 and D102 but should flow in the resistance elements R101 and R102, respectively. That is, voltage drop which occurs to the resistance elements R101 and R102 when the bias currents IB1 and IB2 corresponding to the first bias current flow therein is set to a voltage value much smaller than of about 0.7 V which is forward voltage of the diodes D101 and D102. Due to the voltage drop, pluralities of reference voltage VP same in voltage value are being outputted to a conversion voltage terminal VM and a reference voltage terminal VP.

Detecting an optical signal, a photo diode PD helps to add a current input signal Iin to the bias current IB1 which is the first bias current. Therefore, voltage drop occurs to the resistance element R101 in response to current quantity of the current input signal Iin. Even though voltage drop is added, a current input signal Iin mainly flows in the resistance element R101 as long as the voltage drop is much smaller than of about 0.7 V which is the forward voltage of the diode D101. It should be noted that output voltage corresponds to differential voltage between voltage drop of the resistance element R101 and that of the resistance element R102 since current value of the bias current IB2 flowing in the resistance element R102 is kept with its first bias current without varying.

When the current input signal Iin is small, the voltage drop at the resistance element R101 does not reach of about 0.7 V, the forward voltage of the diode D101. Therefore, conversion voltage VM occurring at the conversion voltage terminal VM corresponds to voltage at the resistance element R101 obtained due to voltage drop. As a result, the output voltage corresponding to a differential voltage varies in proportion to current value of the current input signal Iin, whereby output voltage effective to a small value of a current input signal Iin can be obtained. It is preferable that the bias current flowing in the bias currents IB1 and IB2 should be set to an appropriate small current value so as to take this proportional region appropriately wide. The differential amplifier circuit AMP101 can detect the output voltage. It should be noted that detectable differential voltage is small compared with an offset voltage source VSET at the bias current control section 10. Accordingly, an input level detecting circuit 11 does not output a detecting signal VS for switching bias currents IB1 and IB2.

The larger a current input signal Iin is, the larger voltage drop of the resistance element R101. When the voltage drop reaches of about 0.7 V, the diode D101 connected in parallel with the resistance element R101 reaches its forward voltage to start being conductive. Conversion voltage VM at the conversion voltage terminal VM at this condition is regarded as maximum drop voltage, and differential voltage between the maximum drop voltage and the reference voltage VP at the reference voltage terminal VP is regarded as maximum output voltage. A voltage value of the offset voltage source VSET at the bias current control section 10 should be set to an appropriate voltage value which makes a differential voltage the maximum output voltage at most. With such a voltage value, the input level detecting circuit 11 detects that output voltage reaches a predetermined voltage value when the output voltage reaches the offset voltage source VSET. A detecting signal VS outputted from the output terminal VS is inversed to high level, whereby the control circuit 12 is set and the control signal VC in high level is outputted from the control terminal VC. Detecting the control signal VC, the constant current circuit 13 makes the bias current IB1 and IB2 increase to the second bias current from the first bias current. The bias currents IB1 and IB2 flow to the resistance elements R101 and R102 through the transistors Q101 and Q102, respectively, wherein voltage drop of the resistance elements R101 and R102 is kept at of about 0.7 V. Current higher than the bias currents IB1 and IB2 flows to the diodes D101 and D102. If a current value of the current input signal Iin is smaller than a predetermined current value, conversion voltage VM corresponds to voltage drop at the resistance element R101 which occurs when the current input signal Iin flows there, whereby output voltage keeps a conversion characteristic proportional to the current value of the current input signal Iin. If a current value of the current input signal Iin is larger than a predetermined current value, conversion voltage VM corresponds to forward voltage drop at the diode D101 which occurs when the current input signal Iin flows there, whereby output voltage have a conversion characteristic compressed against the current value of the current input signal Iin.

Therefore, by setting the predetermined current value appropriately, output voltage against a wide range of current input signals Iin can be kept at a predetermined differential voltage. Accordingly, it is not necessary to change input dynamic range of the differential amplifier circuit AMP101 between a current input signal Iin at a small current region and a current input signal Iin at a large current region.

Figure 3:
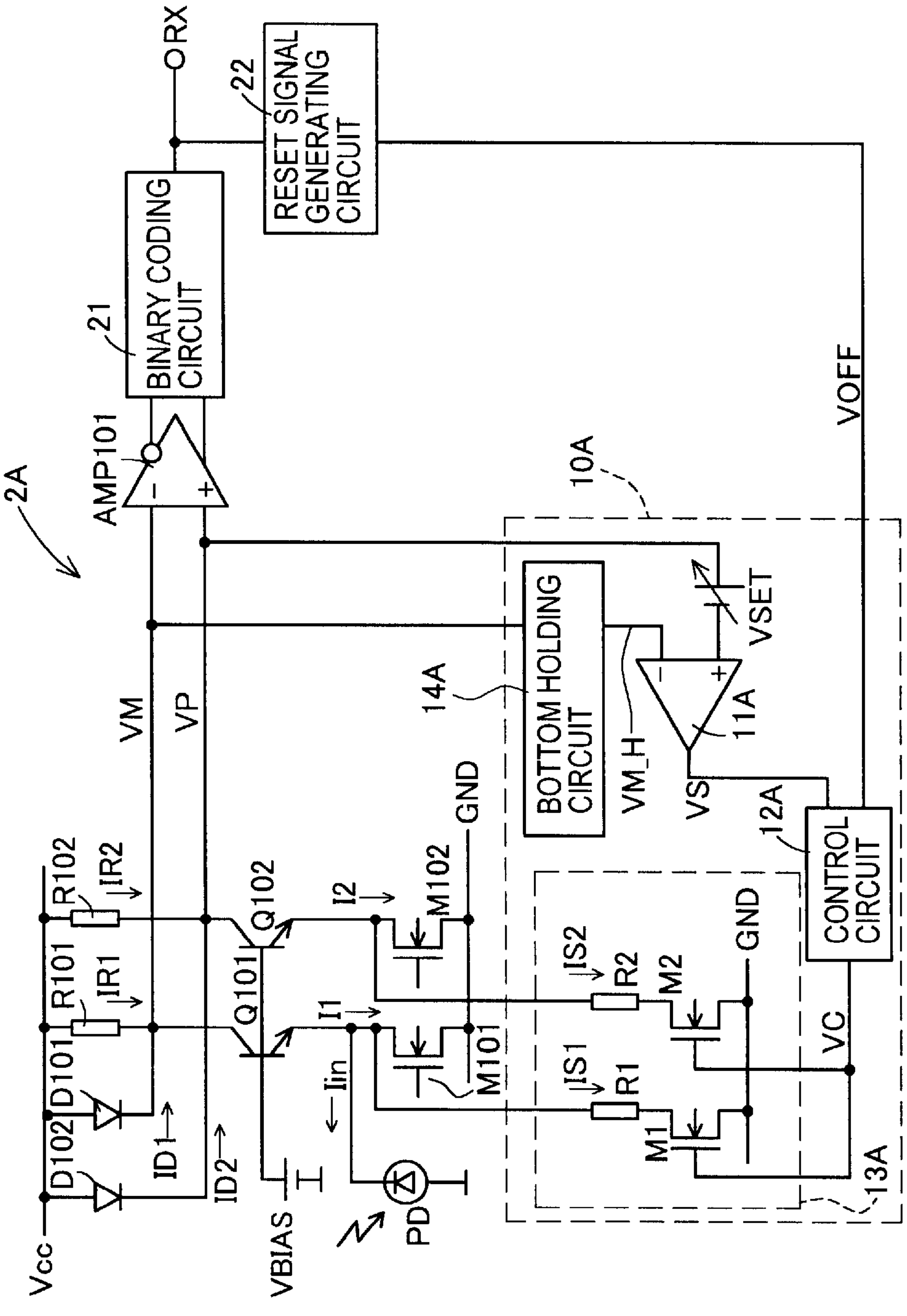
FIG. 3 is a circuit block diagram showing a specific example of the current-voltage converter directed to the second embodiment.

A current-voltage converter 2A directed to a second embodiment shown FIG. 3 is structured such that a comparator 11A constitutes an input level detecting circuit in the bias current control section 10A. A comparator 11A has two differential input terminals, namely, an inversion input terminal and a non-inversion input terminal. More specifically, bottom voltage VM_H of conversion voltage VM at the conversion voltage terminal VM is held by the bottom holding circuit 14A is connected to the inversion input terminal, and a low-voltage side terminal of an offset voltage source VSET to which offset voltage VSET negative to reference voltage VP of the reference voltage terminal VP is added is connected to the non-inversion input terminal. A logic signal VS in high level is outputted from an output terminal VS of the comparator 11A and then inputted to a control circuit 12A. Detecting the logic signal VS, the control circuit 12A outputs a logic signal VC in high level from its output terminal VC. On the other hand, a reset signal VOFF is inputted in the control circuit 12A and an input of the reset signal VOFF resets the control signal VC low level. The reset signal VOFF is outputted from a reset signal generating circuit 22. Output voltage corresponding to differential voltage between the conversion voltage terminal VM and the reference voltage terminal VP converts a differential output signal differentially amplified at the differential amplifier circuit AMP101 into a logic circuit RX with the aid of a binary coding circuit 21. The reset signal generating circuit 22 is provided to output a reset signal VOFF when detecting an input of a logic signal RX. The constant current circuit 13A comprises: a current source constituted by NMOS transistors M101 and M102 which respectively supply first bias currents I1 and I2 as bias currents IB1 and IB2; and resistance elements R1 and R2 which respectively determine bias current values IS1 and IS2 obtained between the NMOS transistors M1 and M2 gate terminals of which are connected to the output terminal VC going out from the control circuit 12A and current paths made conductive by the NMOS transistors M1 and M2. Since the first bias currents I1 and I2 keep flowing, second bias currents are made up by adding the current values IS1 and IS2 to the first bias currents I1 and I2, respectively. It should be noted that terminal gates of the NMOS transistors M101 an M102 are biased by a control voltage not shown, whereby constant current characteristics of the first bias currents I1 and I2 are maintained. A current mirror circuit or the like holds true of a typical example of it.

At a point that output voltage reaches the offset voltage source VSET, the bottom voltage VM_H of the conversion voltage inputted to the inversion terminal of the comparator 11A drops exceeding the reference voltage VP from which the offset voltage VSET inputted to the non-inversion terminal is subtracted, whereby the output signal VS is inversed to high level. The control circuit 12A to which the output signal VS in high level has been inputted outputs a control signal VC in high level. The control signal VC is inputted to the gate terminals of the NMOS transistors M1 and M2. Therefore, the NMOS transistors M1 and M2 are made conductive and the current paths running through the resistance elements R1 and R2 are additionally connected to the drain terminals of the NMOS transistors M1 and M2, respectively. It should be noted that high-voltage side terminals of the resistance element R1 and R2 are connected to the bias voltage source VBIAS via base-emitter junction of the transistors Q101 and Q 102. Therefore, a voltage value that a bias voltage source VBIAS from which forward voltage between base-emitter (of about 0.7 V) is subtracted is applied there. Thereby, current values IS1 and IS2 flowing in the added current paths are determined. The first bias currents I1 and I2 keep flowing then. Therefore, by determining the current values IS1 and IS2 by appropriately designating resistance values of the resistance elements R1 and R2 and a voltage value of the bias voltage source VBIAS, there is determined a value of the second bias current as a sum of the current values IS1, IS2 and the first bias currents I1, I2.

On the other hand, the first bias current reverts itself from the second bias current when a reset signal VOFF is inputted to the control circuit 12A. When a reset signal VOFF is inputted, a control signal VC is inversed to low level. Thereby, NMOS transistors M1 and M2 are made non-conductive and the additional current paths are closed, accordingly. As a result, only the current paths for first bias current I1 and I2 are left conductive. A reset signal VOFF is generated by the reset signal generating circuit 22, under conditions such that a binary-coded output signal RX has been detected and the output signal RX is not outputted during a predetermined period, which will be described later. In case the binary-coded output signal RX is not outputted during the predetermined period, it is regarded that a series of receipt of current input signals Iin is completed. As a result, bias states of the bias current IB1 and IB2 revert to their original states.

Figure 4:
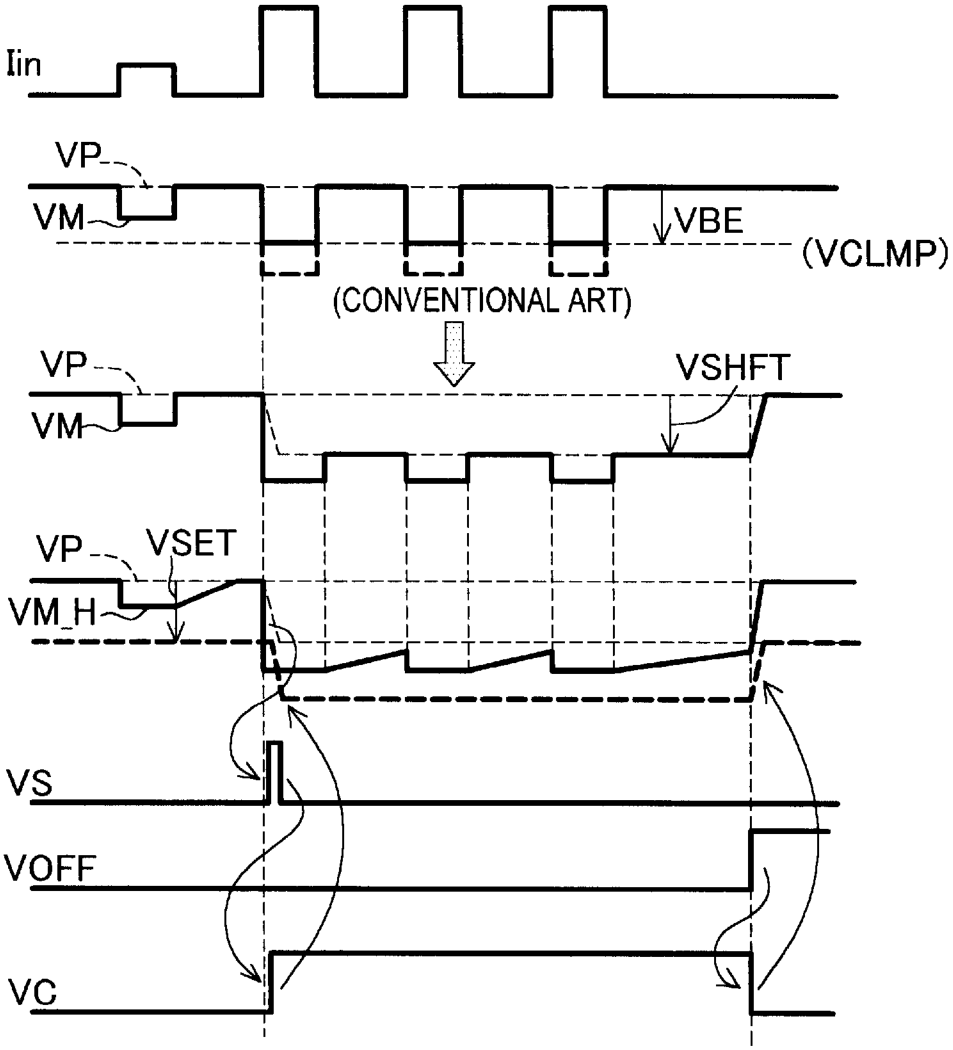
FIG. 4 shows operational waveforms of the current-voltage converter directed to the first and second embodiments.

FIG. 4 concisely shows operational waveforms of the first and second embodiments to be compared with the related art. Current intensity of current input signal Iin is wide in its diversity. With respect to current input signals Iin, FIG. 4 shows a case such that intensity of second through fourth current pulses is large compared with a first current pulse. In the first and second related art, in case large current of current pulses are inputted, conversion voltage VM at the conversion voltage terminal VM is clamped. In this situation, the voltage value of the conversion voltage VM corresponds to reference voltage VP with voltage dropping by the forward voltage VBE (of about 0.7 V) directed to the diode D101. Accordingly, output voltage, that is, differential voltage between conversion voltage VM and reference voltage VP has a large value in case of the second through fourth current pulses compared with the case of the first current pulse.

In the first and second embodiments, when the second current pulse which is a large current pulse is inputted, conversion voltage lowers significantly. Thereby, this bottom holding voltage is inputted to either the input level detecting circuit 11 or the comparator 11A as output voltage VM_H of the bottom holding circuits 14 and 14A. The bottom voltage VM_H at this condition lowers more than a voltage value of reference voltage VP from which negative offset voltage VSET is subtracted. Accordingly, the input level detecting circuit 11 detects that a voltage value of the conversion voltage VM has lowered exceeding a predetermined voltage set as offset voltage VSET and the comparator 11A inverses an output signal VS into high level. Thereby, a control signal VC from the control circuit 12 or 12A is set high level and the bias currents IB1 and IB2 increase from the first bias currents I1 and 12 to the second bias currents I1+IS1 and I2+IS2, respectively.

When the second bias currents I1+IS1 and I2+IS2 flow, voltage drop VSHFT due to the added currents IS1 and IS2 is applied to the conversion voltage VM and the reference voltage VP in common. Thereby, there is applied the voltage drop VSHFT is also applied to bottom holding voltage VM_H corresponding to an inversion input of either the input level detecting circuit 11 or the comparator 11A, and reference voltage VP with off set voltage VSET which is a non-inversion input. Accordingly, conversion voltage VM, reference voltage VP, bottom holding voltage VM_H and reference voltage VP with offset voltage VSET altogether shift to low voltage side by the voltage drop VSHFT in parallel and keep their operations. After voltage drop caused by parallel shift down of the reference voltage, potential relationship between bottom holding voltage VM_H whose voltage has dropped in advance to the other kinds of voltages and reference voltage VP from which offset voltage VSET is subtracted re-reverses. Due to the re-reverse of voltage relationship, output voltage VS of either the input level detecting circuit 11 or the comparator 11A inverses into low level. However, even such a case, if the control circuits 12 and 12A have latch sections, a control signal VC keeps high level to let the second bias currents as bias currents IB1 and IB2 flowing.

When each of the current pulses terminates, voltage drop of the conversion voltage VM stops and its voltage level reverts to the reference voltage VP. The reference voltage VP at this condition stems from voltage drop generated when the second bias current flows. On the other hand, the bottom holding circuit VM_H for the conversion voltage VM cannot catch up with voltage rise of the conversion voltage VM immediately but reverts to voltage level of the reference voltage VP gradually based on the circuit structures of the bottom holding circuits 14 and 14A, the inversion input terminal of the input level detecting circuit 11 or the comparator 11A. The situation such as above is got rid of when a subsequent current pulse is inputted and voltage of the conversion voltage VM drops again. (This holds true a period between end of a second current pulse and beginning of a third current pulse and a period between end of the third current period and beginning of a fourth current pulse.)

On the other hand, at a point where an end of the fourth period, i.e., inputs of a series of current pulses have completed, voltage value of the bottom holding voltage VM H starts rising after voltage of the conversion voltage VM reverts to level of the reference voltage VP. Next, a reset signal VOFF generated at a reset signal generating circuit 22 (described later) resets the control circuits 12 and 12A to let the control signal VC revert to low level. Thereby, the NMOS transistors M1 and M2 are set off, the additional current path is stopped, and the bias currents IB1 and IB2 revert to the first bias current I1 and I2, respectively. Accordingly, the conversion voltage VM, the reference voltage VP and the like revert to voltage of the initial state and shift to stand-by state for inputs of next current pulses. It should be noted that a reset signal VOFF or the like may be inputted to a control circuit not shown so that the output terminals of the bottom holding circuits 14 and 14A should be short-circuited to the conversion voltage terminal VM. Thereby, remaining voltage of the bottom holding voltage VM_H is got rid of.

Figure 5:
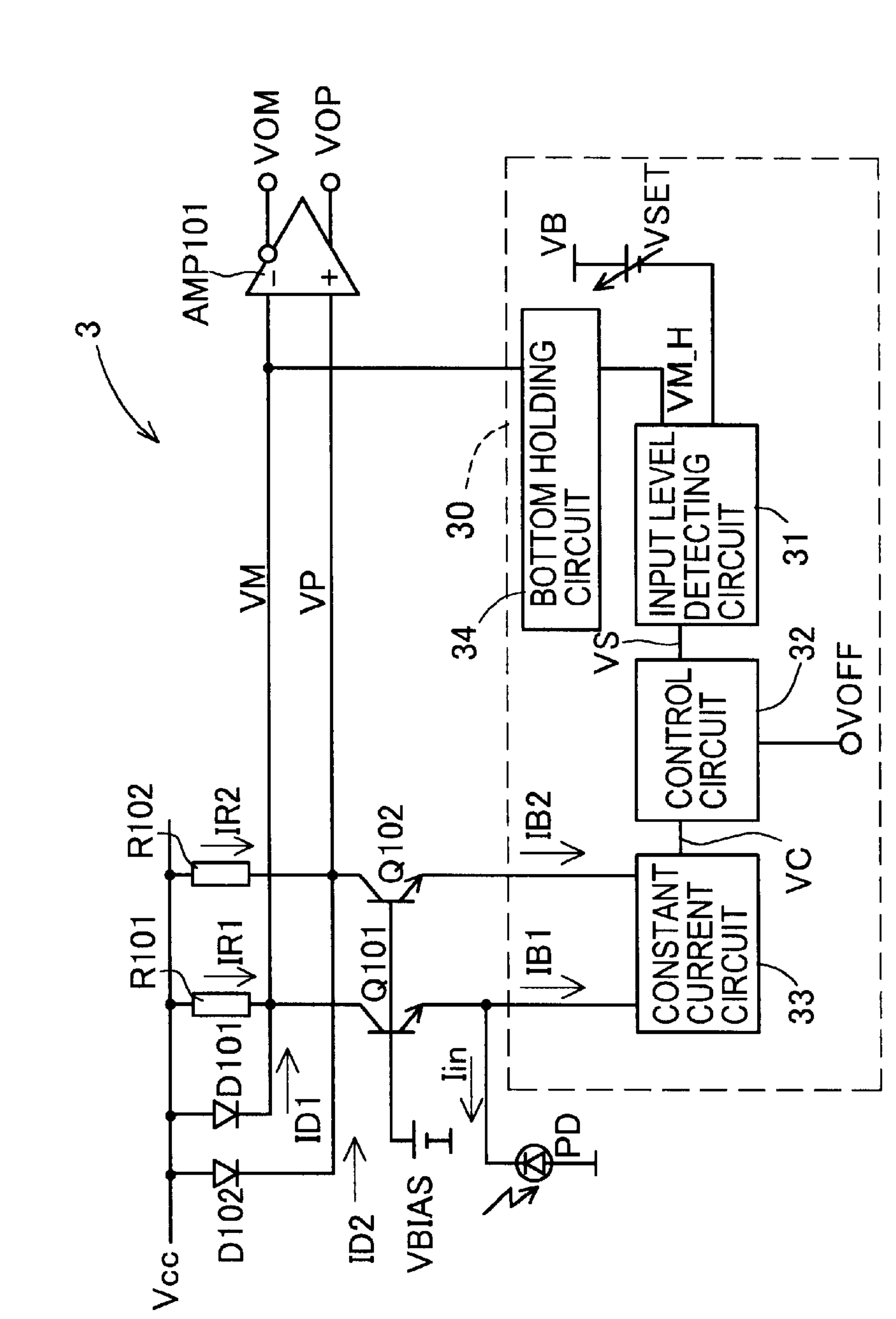
FIG. 5 is a circuit block diagram showing a current-voltage converter directed to a third embodiment.

In a current-voltage converter 3 directed to a third embodiment shown in FIG. 5, instead of inputting reference voltage VP with offset voltage VSET to the input level detecting circuit 11 directed to the second embodiment, voltage-dropped voltage of predetermined voltage VSET from predetermined fixed voltage VB not the same as the reference voltage VP is inputted the input level detecting circuit 31. A point when current values of bias currents IB1 and IB2 are switched to the second bias current from the first bias current corresponds to a point when predetermined voltage drop occurs to the conversion voltage VM due to a predetermined current input signal Iin under a first bias current state. Accordingly, comparative voltage at the input level detecting circuit 31 does not need to be set based on reference voltage VP whose voltage value is variable depending on second bias current but is set based on voltage drop of the predetermined voltage VSET which has dropped from the fixed voltage VB. It should be noted that, same numbers are assigned to component elements having structures the same as those of the second related art, the first and the second embodiments and descriptions of them will be omitted, accordingly. Furthermore, an input level detecting circuit 31, a control circuit 32, a constant current circuit 33, and a bottom holding circuit 34 in the third embodiment are the same as the level detecting circuit 11, the control circuit 12, the constant current circuit 13, and the bottom holding circuit 14 which constitute a functional circuit block directed to the first embodiment. Therefore, descriptions of them will be omitted hereinafter.

Figure 6:
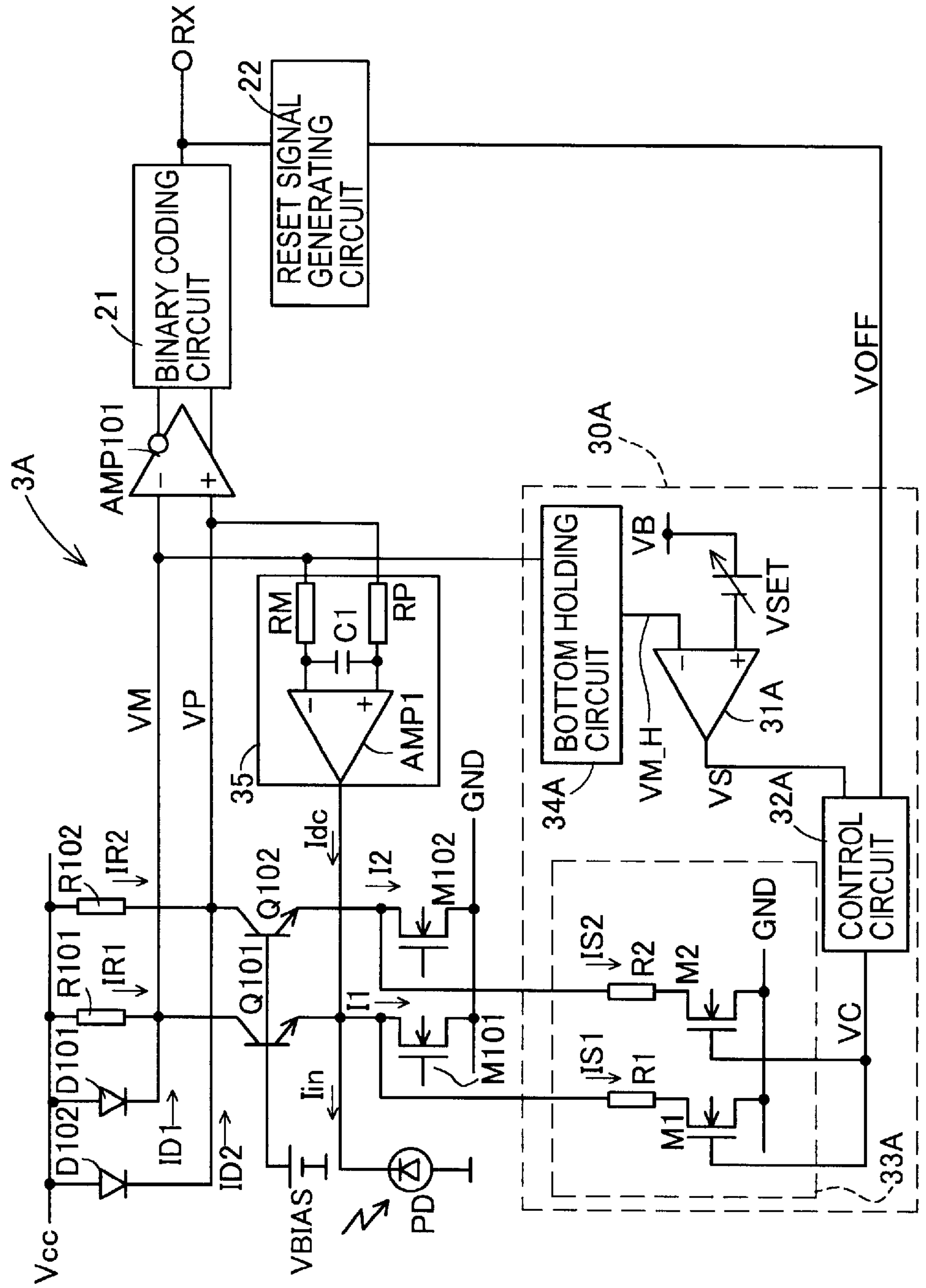
FIG. 6 is a circuit block diagram showing a specific example of the current-voltage converter directed to the third embodiment.

In a current-voltage converter 3A directed to a specific example of a third embodiment shown in FIG. 6, a bias current control section 30A includes a comparator 31A, a control circuit 32A, a constant current circuit 33A and a bottom holding circuit 34A. That is, the bias current control section 30A is similar to the bias current control section 10A directed to the specific example of the second embodiment. In the bias current control section 30A, instead of reference voltage VP with offset voltage VSET, voltage-dropped voltage of predetermined voltage VSET from predetermined fixed voltage VB is inputted to a non-inversion input terminal of the comparator 31A. Instead of setting voltage drop of the offset voltage VSET from the reference voltage VP while the first bias current flows, it is easy to set such that voltage drop of the predetermined voltage VSET from the fixed voltage VB should be equal to the voltage drop of the offset voltage VSET from the reference voltage VP. Setting the voltage drop of the predetermined voltage VSET from the fixed voltage VB enables the current-voltage converter 3A to switch of the bias currents IB1 and IB2 when there is inputted a current input signal Iin similar to the current-voltage converter 2A directed to the specific example of the second embodiment.

It should be noted that same numerals are assigned to component elements similar to those of the specific example directed to the second embodiment and descriptions of them will be omitted. Furthermore, the input level detecting circuit, that is, the comparator 31A, the control circuit 32A, the constant current circuit 33A and the bottom holding circuit 34 are the same as the input level detecting circuit, that is, the comparator 11A, the control circuit 12A, the constant current circuit 13A and the bottom holding circuit 14A which constitute a functional circuit block directed to the second embodiment. Therefore, descriptions of them will be omitted hereinafter.

The current-voltage converter 3A is provided with a differential amplifier circuit AMP1 as an input-offset-current canceling circuit 35. In the differential amplifier AMP1, an inversion input terminal is connected to the conversion voltage terminal VM via a resistance element RM and non-inversion input terminal is connected to the reference voltage terminal VP via a resistance element RM. Furthermore, the two input terminals of the differential amplifier circuit AMP1 are connected by a capacitance element C1 and an output terminal of it is connected to a terminal to input a current input signal Iin. That is, the current-voltage converter 3A is structured such that when direct-current-like offset between the conversion voltage terminal VM and the reference voltage terminal VP is detected, current for offset cancel is feedback to a terminal to which a current input signal Iin has been inputted. With such structure, the present invention can obtain function and effects similar to other embodiments herein.

Figure 7:
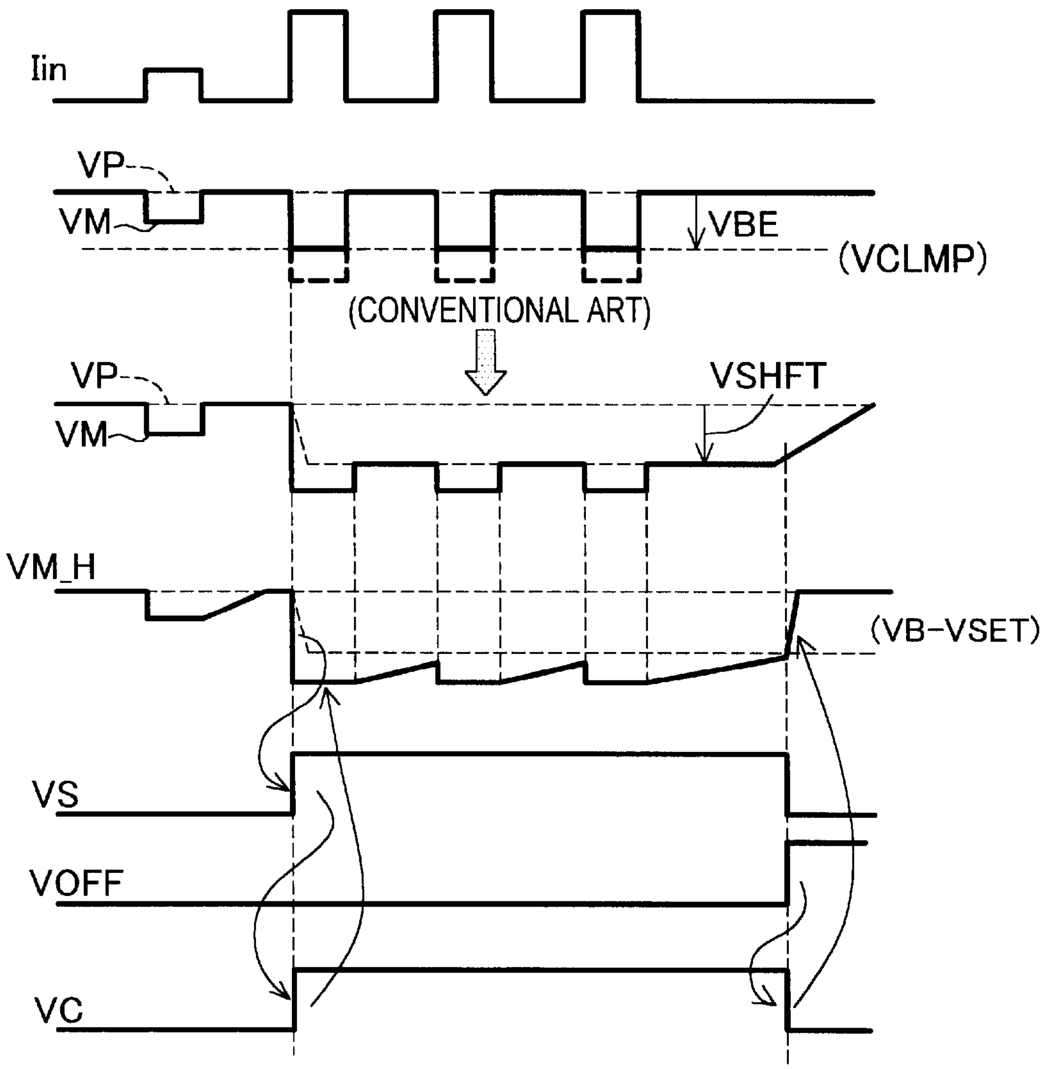
FIG. 7 shows operational waveforms of the current-voltage converter directed to the third embodiment.

Operational waveforms of the specific example 3A of the third embodiment, shown in FIG. 7, are similar to those of the specific example 2A of the second embodiment shown in FIG. 4. In the specific example 3A of the third embodiment, voltage corresponding to fixed voltage VB which has dropped by the predetermined voltage VSET is inputted to the non-inversion input terminal of the comparator 31A. This voltage is constant. In case of FIG. 7, bottom holding voltage VM_H of the conversion voltage VM is designed to lower voltage to be inputted to the non-inversion input terminal of the comparator 31A after the bias currents IB1 and IB2 are switched to the second bias currents from the first bias currents and the reference voltage VP shift to voltage drop VSHFT. Thereby, output voltage VS from the comparator 31A keeps high level.

After a series of current pulses terminate, the control circuit 32A is reset on receipt of a reset signal VOFF, similar to the second embodiment. Thereby, a control signal VC is set low level and current values of the bias currents IB1 and IB2 are reverted to their first bias currents I1 and I2. This operational manner is similar to the second embodiment. Furthermore, after the bias currents IB1 and IB2 return to their first bias currents, output voltage VS of the comparator 31A inverses to low level due to rise of reference voltage VP at conversion voltage terminal VM. Although FIG. 7 does not illustrate, output voltage VS inverses to low level with the following voltage setting. To be specific, even though a reset signal VOFF is not used, after termination of current pulses, high-low relation between voltage value of bottom holding voltage VM_H and that of fixed voltage VB from which predetermined voltage VSET is subtracted may be set reversed while voltage level of the second bias current which corresponds to that of conversion voltage VM reverts to that of reference voltage VP. That is, input voltage relations (high-low relations) in the comparator 31A inverse at the reverse point of the two voltage values. Thereby, the output voltage VS inverses from high level to low level. Rising speed of voltage level with respect to the bottom holding voltage VM_H depends on circuit structures of input terminals of the bottom holding circuit 34A and comparator 31A. However, once the rising speed and voltage values of fixed voltage VB and predetermined voltage VSET are set to appropriate values, installation of a reset signal generating circuit 22 (described later) is not required, whereby a latch section (not shown) will not be required for the control circuit 32A.

Figure 8:
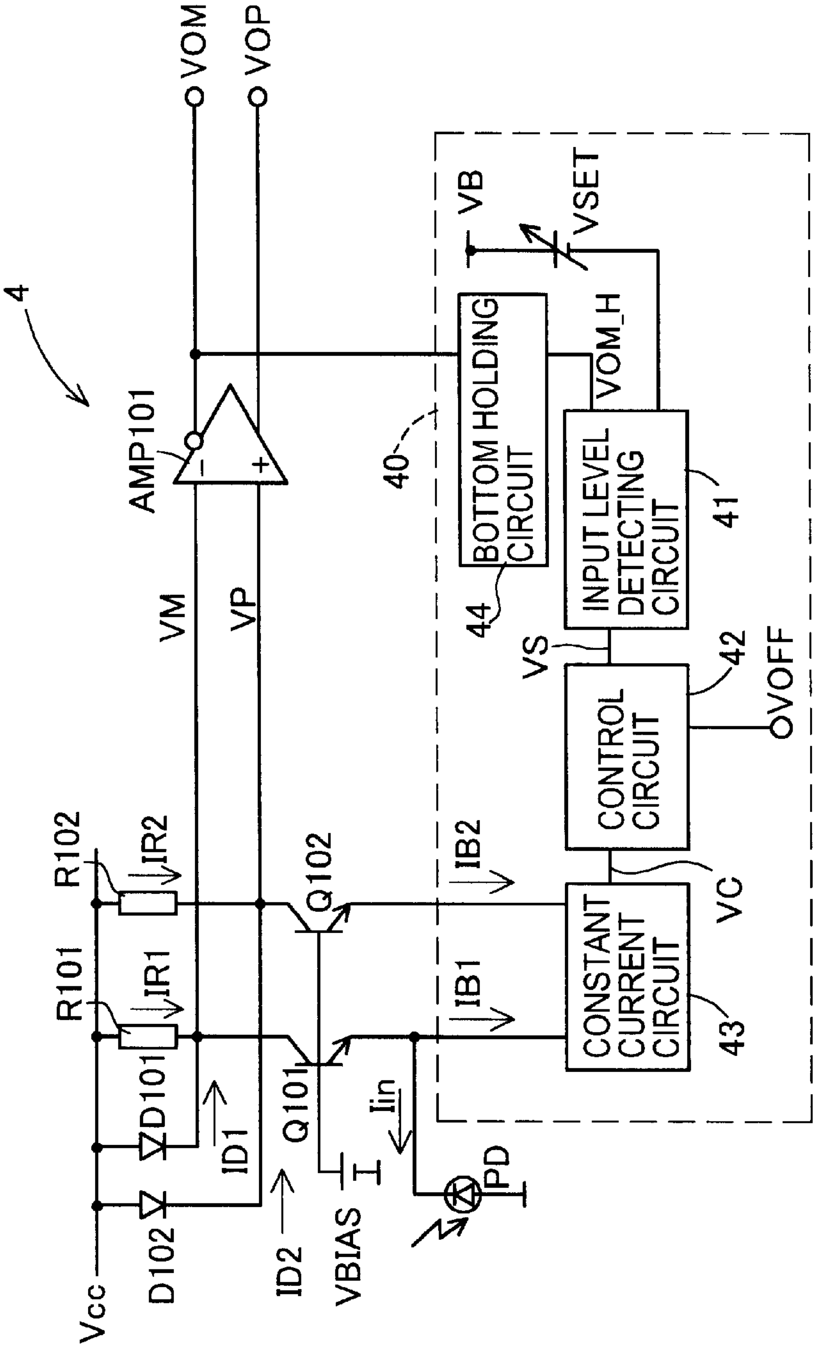
FIG. 8 is a circuit block diagram showing a current-voltage converter directed to a fourth embodiment.

In a current-voltage converter 4 directed to a fourth embodiment shown in FIG. 8, instead of inputting conversion voltage VM to the bottom holding circuit 34 in the bias current control section 30 directed to the third embodiment, an inversion output signal VOM is inputted to a bottom holding circuit 44. More specifically, in the fourth embodiment, conversion voltage VM and reference voltage VP are inputted to a differential amplifier circuit AMP101 and differential output signals VOM and VOP differentially amplified are outputted therefrom. Out of the two signals, the differential output signal VOM is inputted as an input signal. By setting the fixed voltage VB and the predetermined voltage VSET to appropriate voltage values, voltage drop of the predetermined voltage VSET dropping from the fixed voltage VB and the bottom holding voltage VOM_H outputted from the bottom holding circuit 44 are inputted to an input level detecting circuit 41 and compared therein. The input level detecting circuit 41 sets a point to switch current values of the bias currents IB1 and IB2 from their first bias currents to second bias currents.

As to element structures the same as those of the second related art and the first through third embodiments, numerals identical to those embodiments are assigned in the fourth embodiment. Accordingly descriptions of them will be omitted. Furthermore, the input level detecting circuit 41, the control circuit 42, the constant current circuit 43 and the bottom holding circuit 44 are similar to the functional circuit block directed to the third embodiment constituted by the input level detecting circuit 31, the control circuit 32, the constant current circuit 33 and the bottom holding circuit 34, respectively. Descriptions of them will be omitted, accordingly.

Figure 9:
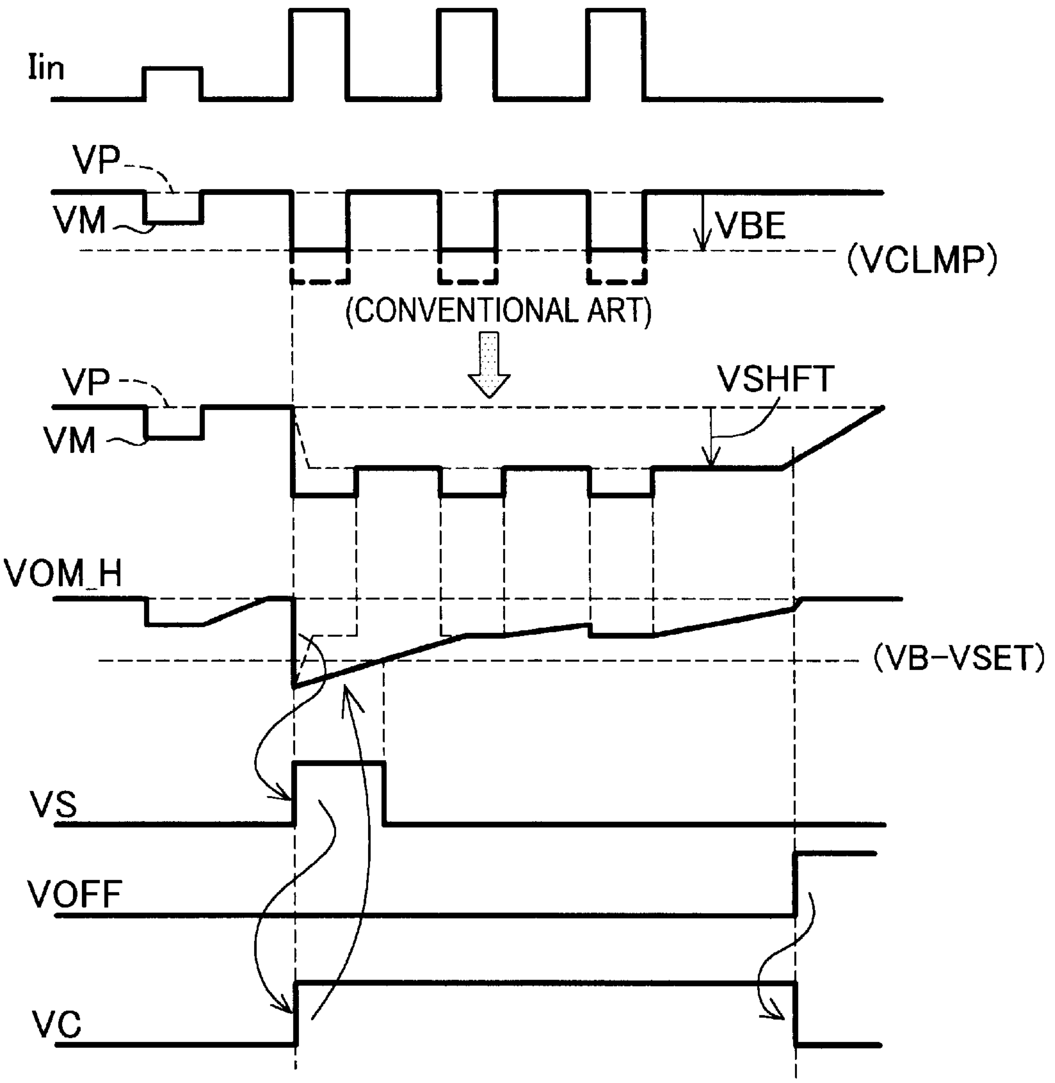
FIG. 9 shows operational waveforms of the current-voltage converter directed to the fourth embodiment.

Operational waveforms of the current-voltage converter 4 directed to the fourth embodiment shown in FIG. 9 are basically similar to the operational waveforms shown in FIG. 4 or FIG. 7. In the current-voltage converter 4, different from the waveforms of the specific example 3A of the third embodiment shown in FIG. 7, bottom holding voltage VOM_H with respect to an inversion output signal VOM from the differential amplifier circuit AMP101 is inputted to the input level detecting circuit 41. In case the fixed voltage VB and the predetermined voltage VSET are set to appropriate voltage values, when a current input signal Iin with a large current value (i.e., a current pulse of second bias current), the bottom holding voltage VOM_H lowers a voltage value of the predetermined voltage VSET dropping from the fixed voltage VB in the input level detecting circuit 41. As a result, it can be detected that the bottom holding voltage VOM_H has reached a voltage value of the fixed voltage VB from which the offset voltge VSET is subtracted to switch current values of the bias currents IB1 and IB2. Similar to cases of FIG. 4 and FIG. 7, when output voltage VS inverses to high level, a control VC in high level is outputted from the control circuit 42. In FIG. 9, differential voltage between conversion voltage VM and reference voltage VP, wherein the bias currents IB1 and IB2 have been switched to their second bias currents, is designed to be compressed against differential voltage before the bias currents IB1 and IB2 are switched from their first bias currents to second bias currents. Therefore, voltage drop of an inversion output signal VOM corresponding to an output signal from the differential amplifier circuit AMP101 is set high in a state that the bias currents IB1 and IB2 have been switched to their second bias currents. As a result, the bottom holding voltage VOM_H gradually rises to exceed fixed voltage VB voltage value of which has dropped by predetermined voltage VSET, whereby operation can be kept. At a point the bottom holding voltage VOM_H and the fixed voltage VB dropped by the predetermined voltage VSET coincide, output voltage VS from the input level detecting circuit 41 re-inverses to low level. In this case as well, if the control circuit 42 has a latch section (not shown), a control signal VC can keep high level and the second bias currents can be kept being applied.

After a series of current pulses terminate, the control circuit 42 is reset on receipt of a reset signal VOFF, similar to the second embodiment shown in FIG. 4 or the third embodiment in FIG. 7. Thereby, a control signal VC is set low level and current values of the bias currents IB1 and IB2 are reverted to their first bias currents I1 and I2.

Figure 10:
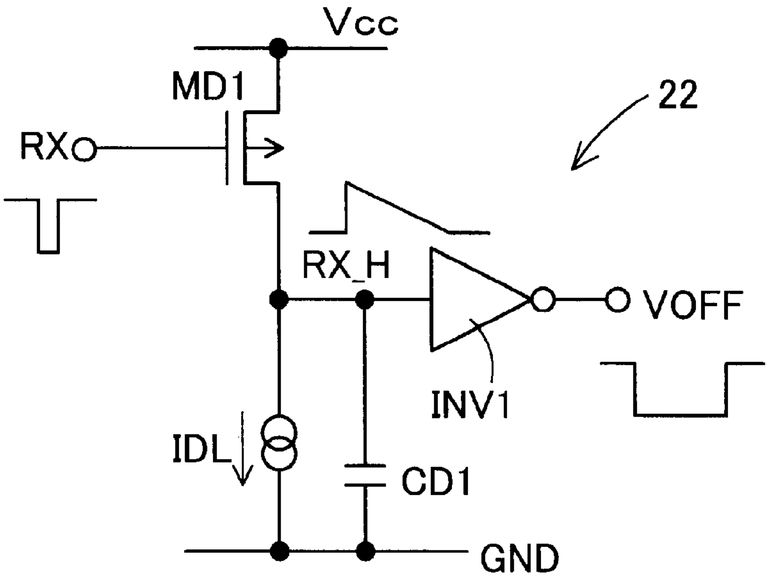
FIG. 10 is a circuit diagram showing a specific example of a reset signal generating circuit.

FIG. 10 shows a specific example of the reset signal generating circuit 22. As an output signal of a current-voltage converter, a logic signal RX is delivered to a gate terminal of a PMOS transistor MD1. Its source terminal is connected to power source voltage VCC, and its drain terminal is connected to ground voltage GND via a constant current source IDL and a capacitance element CD1 wired in parallel to each other. Further on, its drain terminal is connected to an inverter gate INV1 and an output terminal of the inverter gate INV1 works as an output terminal VOFF of the reset signal generating circuit 22. It should be noted that the drain terminal of the PMOS transistor MD1 constitutes a peak holding terminal RX_H which is logically inversed against a logic signal RX.

Figure 11:
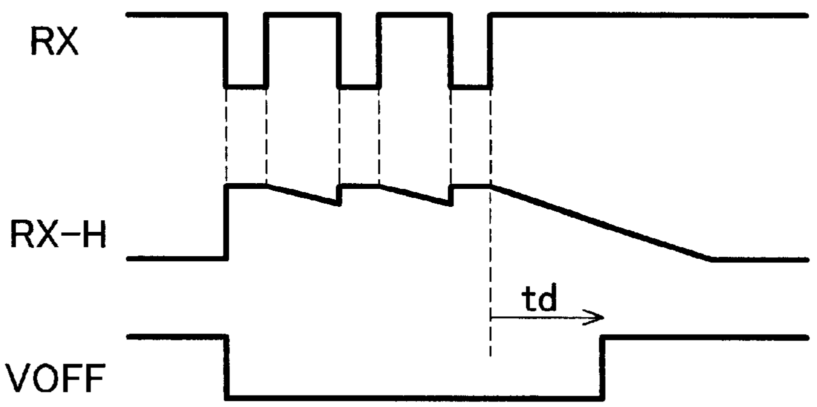
FIG. 11 shows operational waveforms directed to the specific example of the reset signal generating circuit.

Operation of the reset signal generating circuit 22 will be described by referring to operational waveforms shown in FIG. 11. When a logic signal RX inverses to low level, the PMOS transistor MD1 turns on. Thereby, the peak holding terminal RX_H turns to high level and the power source voltage VCC is charged with the capacitance element CD1. Vice versa, when a logic signal RX inverses to high level, the PMOS transistor MD1 turns off. As a result, a path for supplying charges to the capacitance element CD1. Therefore, charges in the capacitance element CD1 are discharged by a constant current source IDL and voltage of the peak holding terminal RX_H drops having a predetermined gradient. In case the logic signal RX inverses to low level from high level with this state, the PMOS transistor MD1 turns on and the peak holding terminal RX_H is charged up to voltage level of the power source voltage VCC again. Thus, while the logic signal RX continues with a predetermined length of intervals being taken, voltage of the peak holding terminal RX_H is kept higher than a predetermined voltage value without exceeding voltage level of the power source voltage VCC. Once this voltage value is set higher than threshold voltage of the inverter gate INV1, the reset signal VOFF is kept low level and never outputted. When a set of current pulse inputs terminate and the logic signal RX stops outputting pulse signals in low level, voltage of the peak holding terminal RX_H declines with a constant gradient due to constant current source IDL, as time passes. After a predetermined time td passes, the voltage of the peak holding terminal RX_H lowers the threshold of the inverter gate INV1. Then, an output signal VOFF of the inverter gate INV1 inverses and a reset signal VOFF in high level is outputted.

Figure 12:
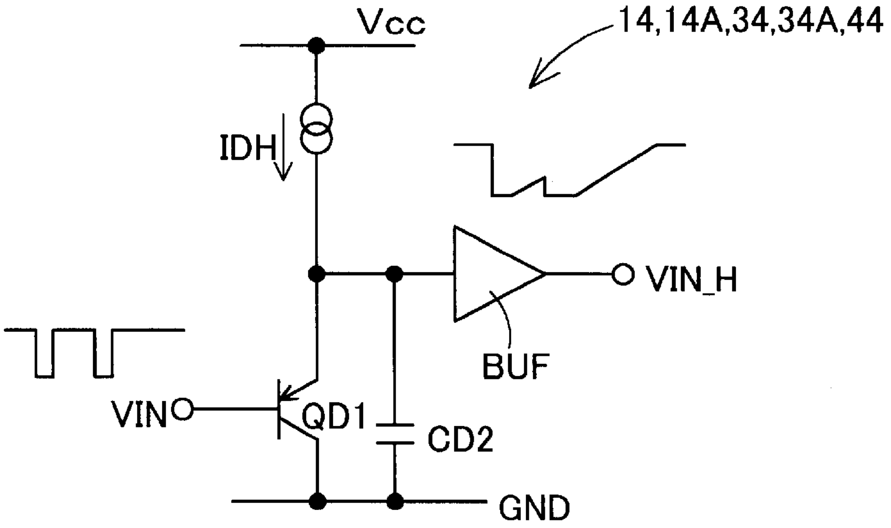
FIG. 12 is a circuit diagram showing a specific example of a bottom holding circuit.
Figure 13:
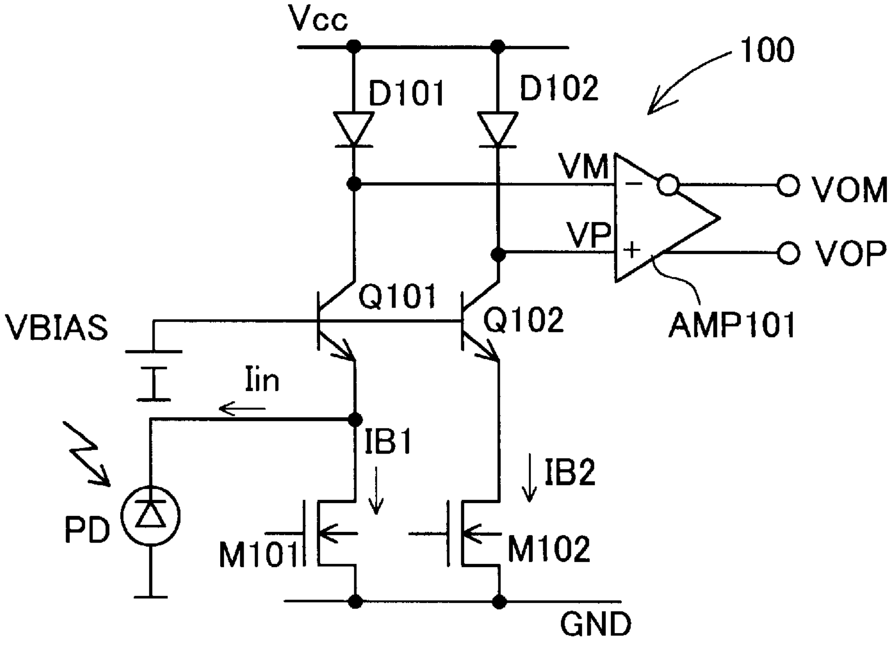
FIG.13 PRIOR ART
FIG. 13 is a circuit diagram showing a current-voltage converter directed to a first related art.
Figure 14:
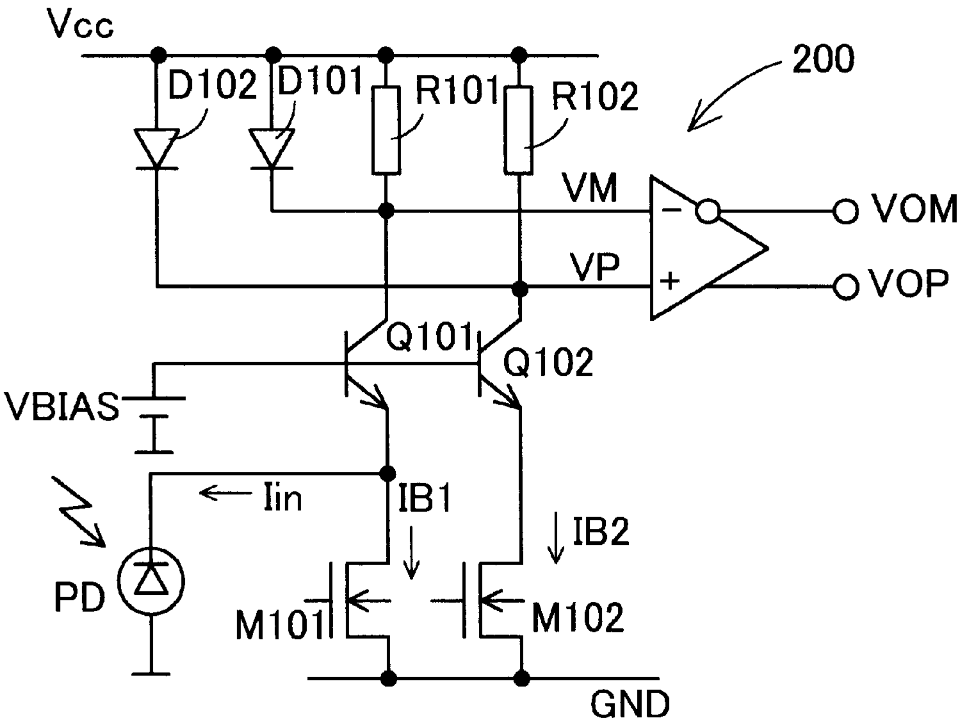
FIG.14 PRIOR ART
FIG. 14 is a circuit diagram showing a current-voltage converter directed to a second related art.

Specific examples of the bottom holding circuit 14, 14A, 34, 34A and 44 are shown in FIG. 12. An input signal VIN is delivered to a base terminal of a PNP transistor QD1 a collector terminal of which is connected to ground voltage GND. Its emitter terminal is connected to a capacitance element CD2 connected to the ground voltage GND and current from constant current source IDH connected to the power source voltage VCC is supplied there. Furthermore, the emitter terminal is connected to a buffer circuit BUF. From an output terminal of the buffer circuit BUF, a bottom holding signal VIN_H is outputted.

In the bottom holding circuits 14, 14A, 34, 34A, and 44, current from the constant current source IDH charges the capacitance element CD2 connected to the emitter terminal of the transistor QD1 up to a voltage value higher by forward voltage between the base and the emitter against an input signal VIN inputted therebetween. Next, when voltage level of the input signal VIN lowers, the transistor QD1 becomes conductive and charges in the capacitance element CD2 are discharged. However, due to a characteristic of the PNP transistor QD1, terminal voltage of the capacitance element CD2 will be discharged without lowering a voltage value of the input signal voltage VIN to which base-emitter voltage is added. If voltage level of the input signal VIN rises again, terminal voltage of the capacitance element CD2 is charged up to a voltage value of input signal voltage VIN to which forward voltage between the base and the emitter with a constant gradient by charging the capacitance element CD2 with current outputted from the constant current source IDH. Thereby, as a resultant signal corresponding to voltage value of the capacitance element CD2 buffered in the buffer circuit BUF, a signal voltage value of which is bottom-held is obtained at the output terminal VIN_H.

As described, the first embodiment achieves switching of current-voltage conversion characteristics with respect to current input signals Iin with wide current range by switching current values of bias currents IB1 and IB2 to be inputted to the diode D101 (the first current-voltage converting section) and the diode D102 (the second current-voltage converting section), respectively, as reference currents between their first bias currents and second bias currents. In case a current input signal Iin with micro current is inputted, the first bias currents of the bias currents IB1 and IB2 are set small. Characteristics of the diodes D101 and D102 for conducting current-voltage conversion hold down to a region where change rate of voltage in response to that of small current does not become small region. Therefore, the current input signal Iin will not be swallowed into the first bias currents and an effective output voltage can be obtained without influence of noises. Furthermore, by making conversion rate of current-voltage conversion characteristic in response to a current input signal Iin with a current value same as or smaller than the predetermined current value same as or larger whereas by making the conversion rate in response to a current input signal Iin with a current value same as or larger the predetermined current value, a range of output voltage can be narrowed and compressed while a wide input current range is secured. Thereby, an output voltage range suitable to the differential amplifier circuit AMP101 or the like as a circuit structure of next stage can be set.

In a state before a current-voltage conversion characteristic is compressed, there exists a predetermined conversion characteristic between a current input signal Iin and output voltage equivalent to differential voltage between conversion voltage VM and reference voltage VP. Therefore, whether or not a current input signal Iin has reached the predetermined current value can be detected by the input level detecting circuit 11 which is essentially a detecting section to detect that an output voltage value reaches the predetermined voltage value. Furthermore, the input level detecting circuit 11 uses offset voltage VSET as the predetermined voltage.

According to the second through fourth embodiments, the first bias currents flow into the resistance elements R1 and R2 so as to set reference voltage value within an input current region same as or lower than a predetermined current value and a current input signal Iin mainly flows into the resistance elements R1 and R2, as well. Accordingly, there can be obtained output voltage with a current-voltage conversion characteristic which has proportional relation against a current value of a current input signal Iin, wherein gradient of (output voltage/current value) is constant. Since the characteristic of output voltage against a current input signal Iin is a proportional characteristic which has comparatively large conversion rate, even output voltage against a micro current input signal Iin can be detected.

Furthermore, the second bias currents flow into the diodes D101 and D102 which are non-linear elements so as to set reference voltage value within an input current region same as or higher than the predetermined current value and a current input signal Iin mainly flows into the diodes D101 and D102, as well. Accordingly, there can be obtained output voltage with a current-voltage conversion characteristic of convex-shaped-monotone increasing. As bias currents IB1 and IB2, the second bias currents large enough to make the diodes D101 and D102 biased may be set so that the diodes D101 and D102 can maintain high-speed response capability even against excessive response of a large current input signal Iin and so can high speed capability of output voltage be.

Furthermore, current-voltage conversion characteristics are selectively used depending on current value of a current input signal: a current-voltage conversion characteristic with proportional relation against a current input signal Iin same as or smaller than the predetermined current value; and a current-voltage conversion characteristic compressed against a current input signal Iin same as or larger than the predetermined current value. Therefore, a range of output voltage can be narrowed and compressed while a wide input current range is secured. Thereby, an output voltage range suitable to the differential amplifier circuit AMP101 or the like as a circuit structure of next stage can be set.

Furthermore, in a state before a current-voltage conversion characteristic is compressed, there exists a predetermined conversion characteristic between a current input signal Iin and output voltage equivalent to differential voltage between conversion voltage VM and reference voltage VP. Therefore, whether or not a current input signal Iin has reached the predetermined current value can be detected by the input level detecting circuits 11, 31, and 41 or by the comparators 11A and 31A which are essentially detecting sections to detect that an output voltage value reaches the predetermined voltage value.

Furthermore, in the first through fourth embodiments, each of the control sections 12, 12A, 32, 32A and 42 has a latch section. Thereby, a state of a current input signal Iin is set based on an output signal VS from each of the input level detecting circuits 11, 31, and 41 as a detecting section or from each of the comparators 11A and 31A. In case the current input signal Iin stops and a predetermined period of time has passed, the present state of the current input signal Iin is regarded as having been cancelled and the latch section is reset. Thereby, current values of the bias currents IB1 and IB2 can be reverted to their first bias currents. A current-voltage characteristic can be set suitably depending on input current intensity of every series of input operation of current input signal Iin. However, with respect to the third embodiment, a latch section is no required for the control section 32 because output signal VS from the input level detecting circuit 31 or from the comparator 31A can detect presence/absence of a current input signal Iin.

Not to mention, the present invention is not confined to the foregoing embodiments, but various modifications and alterations are obviously possible within the scope of the substance of the invention.

For example, though the embodiments describe cases in which junction diodes D101, D102 are used as non-linear element. However non-linear element is not limited to the junction type. It may be a diode element constituted by an MOS transistor. That is, a current-voltage conversion characteristic of logarithmic compression can be obtained by using a junction diode element, whereas a current-voltage conversion characteristic of square root compression can be obtained by using a diode element constituted by an MOS transistor.

Furthermore, if there is made use of a base-emitter characteristic of a base-grounded type bipolar transistor, instead of the diodes D101 and D102, a current-voltage conversion characteristic equivalent to logarithmic compression of a junction type diode element can be obtained. Furthermore, if there is made use of a gate-source characteristic of a gate-grounded type MOS transistor, a current-voltage conversion characteristic equivalent to square root compression of a diode element constituted by an MOS transistor can be obtained.

Furthermore, the foregoing embodiments describe cases where the resistance elements R1, R2 and the diodes D101, D102 are connected to a voltage source common to the both elements, in parallel to one another. However, a manner of connection is not limited to the above. Specifically, the voltage source for the both elements may be separated into two such as follows: (1) a voltage source for reference voltage of voltage drop derived from resistance elements; and (2) a voltage source for reference voltage of voltage drop derived from non-linear elements such as diode elements. That is, either resistance elements or non-linear element's may be connected to a voltage source for reference voltages so as to output reference voltage VP and conversion voltage VM both of which can be obtained when voltage drop occurs due to first and second bias currents and an current input signal Iin flowing there. By providing the resistance elements and the non-linear elements with different types of voltage sources, voltage values before and after switching bias currents can be made almost same even if a voltage drop quantity obtained between resistance elements where the first bias current flows and one obtained between non-linear elements where the second bias current flows are different. This is convenient for input specification with respect to a next-staged circuit structure such as the differential amplifier circuit AMP101 or the like.

Furthermore, in the constant current source 13A, 33A, control signals VC outputted from the control circuits 12A, 32A are digital signals whereby switching of the first bias current and the second bias current is conducted. However, a control signal VC is not limited to digital signal. An analog signal as a control signal may be outputted from the control circuits 12A and 32A so that first and second bias currents can be set. For example, in case a control signal VC is a digital signal, setting of the first and second bias currents at the constant current source can be switched by a switching element or the like. In case an analog signal, the setting of the first and second bias currents at the constant current source can be done in a manner of bias control.

Still further, in the current-voltage converter 4 directed to the fourth embodiment, a differential output signal VOM from the differential amplifier circuit AMP101 is inputted to the bottom holding circuit 44 in the bias current control section 40. However, a differential signal having a correlation with the differential output signal VOM may be inputted. It should be noted that the differential signal having a correlation with the differential output signal VOM, mentioned herein, correspond to a signal from any former stages of an output stage from which differential output signal outputted from a differential amplifier circuit or a differential signal generated at a post-stage circuit to which differential output signal outputted. That is, signals having certain relationship with differential output signal are classified as differential output signal.

According to the present invention, there is provided a current-voltage converter capable of surely outputting a voltage output signal regardless of current intensity when converting a current input signal into a voltage output signal, so as to detect presence/absence of a current input signal with a wide current range such as a current signal converted from an optical signal by an optical detective element in the course of optical communications.

What is claimed is:

1. A current-voltage converter that converts input current into output voltage that corresponds to differential voltage between conversion voltage outputted in response to input current and reference voltage comprising:

a first current-voltage converting section that outputs the reference voltage derived from reference current; and a second current-voltage converting section that has a current-voltage conversion characteristic same as the first current-voltage converting section and outputs the conversion voltage in response to the input current, wherein both the current-voltage conversion characteristic of the first current-voltage converting section and that of the second current-voltage converting section are changed to compress conversion rate of the output voltage against the input current in case the input current is same as or higher than a predetermined current value.

2. A current-voltage converter according to claim 1, wherein first bias current is inputted to the first current-voltage converting section as reference current so as to output the reference voltage as well as the input current and the first bias current are incorporated and inputted to the second current-voltage converting section so as to output the conversion voltage when the input current is same as or lower than a predetermined current value; and second bias current, current value of which is higher than that of the first bias current, is inputted to the first current-voltage converting section as reference current so as to output the reference voltage as well as the input current and the second bias current are incorporated and inputted to the second current-voltage converting section so as to output the conversion voltage when the input current is same as or higher than the predetermined current value.

3. A current-voltage converter according to claim 2, wherein the first current-voltage converting section and the second current-voltage converting section respectively include a non-linear element whose terminal-to-terminal voltage against conducting current has a convex-shaped-monotone-increasing characteristic and the current-voltage conversion characteristic of current same as or higher than the second bias current comes to have the convex-shaped monotone increasing characteristic owing to the non-linear element.

4. A current-voltage converter according to claim 3, wherein the non-linear element includes a diode element.

5. A current-voltage converter according to claim 4, wherein the diode element is a junction diode element.

6. A current-voltage converter according to claim 4, wherein the diode element is a diode element constituted by an MOS transistor.

7. A current-voltage converter according to claim 3, wherein the non-linear element includes a bipolar transistor of a base-grounded structure such that the conducting current flows between a collector terminal and an emitter terminal and voltage between a base terminal and the emitter terminal corresponds to the terminal-to-terminal voltage.

8. A current-voltage converter according to claim 3, wherein the non-linear element includes an MOS transistor of a gate-grounded structure such that the conducting current flows between a drain terminal and a source terminal and voltage between a gate terminal and the source terminal corresponds to the terminal-to-terminal voltage.

9. A current-voltage converter according to claim 3, wherein the first current-voltage converting section and the second current-voltage converting section respectively include:

the non-linear element to which the input current mainly flows while the second bias current is inputted and a resistance element which is connected to a current path of the non-linear element in parallel and to which the input current mainly flows while the first bias current is inputted.

10. A current-voltage converter according to claim 9, wherein a voltage source with reference to voltage drop due to the resistance element differs from a voltage source with reference to voltage drop due to the non-linear element.

11. A current-voltage converter according to claim 2 further comprising a first detecting section which detects that differential voltage between the conversion voltage and the reference voltage is same as or higher than a predetermined voltage value, wherein, instead of the first bias current, the second bias current is inputted to the first current-voltage converting section and the second current-voltage converting section based on a detection result obtained by the first detecting section.

12. A current-voltage converter according to claim 2 further comprising a differential amplifying section whose differential input signal corresponds to differential voltage between the reference voltage and the conversion voltage, and a second detecting section which detects that a differential output signal outputted from the differential amplifying section or differential voltage of a differential signal having correlation with the differential output signal is same as or higher than a predetermined voltage value, wherein instead of the first bias current, the second bias current is inputted to the first current-voltage converting section and the second current-voltage converting section based on a detection result obtained by the second detecting section.

13. A current-voltage converter according to claim 11, wherein the first detecting section includes a comparator which regards the predetermined voltage value as offset voltage.

14. A current-voltage converter according to claim 11, wherein the input current coincides with the predetermined current value at the predetermined voltage value.

15. A current-voltage converter according to claim 11 further comprising:

a first current source which supplies either the first bias current or the second bias current to the first current-voltage converting section;

a second current source which supplies either the first bias current or the second bias current to the second current-voltage converting section; and a control section which outputs a control signal for controlling bias current to be outputted by the first current source and the second current source.

16. A current-voltage converter according to claim 15, wherein the control section includes a latch section which is set based on a detection result obtained by the first detecting section and is reset after a lapse of a predetermined time which begins with stop of the input current.

17. A current-voltage converter according to claim 15, wherein the control signal is a digital signal which switches kinds of bias current that the first current source and the second current source should output.

18. A current-voltage converter according to claim 15, wherein the control signal is an analogue signal which switches kinds of bias current that the first current source and the second current source should output.

* * * * *